UNITED STATES PATENT OFFICE.

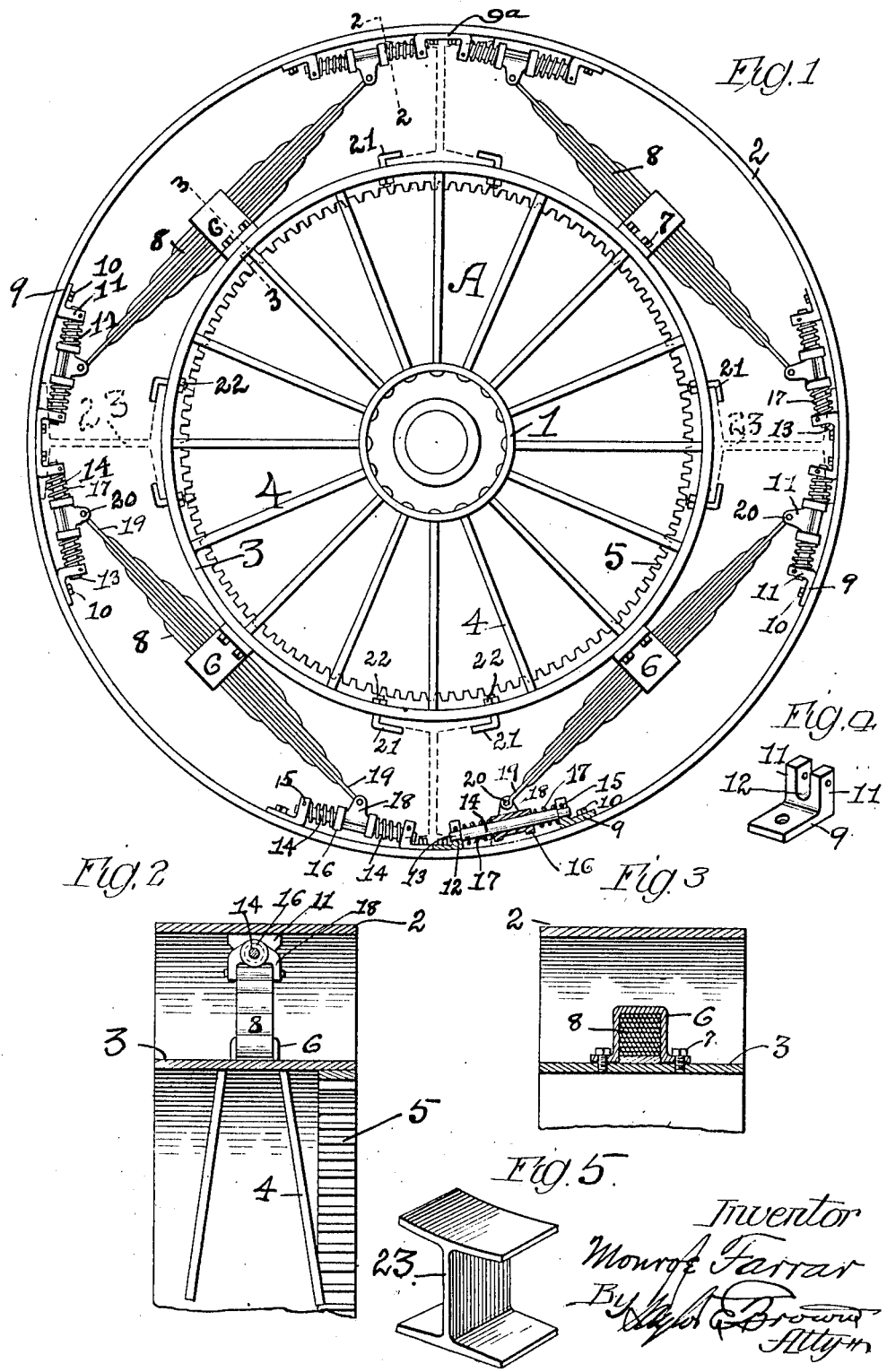

MONROE FARRAR, OF CHICAGO, ILLINOIS.

VEHICLE-WHEEL.

1,314,582. Specification of Letters Patent. Patented Sept. 2, 1919.

Application filed October 24, 1918. Serial No. 259,545.

*To all whom it may concern:*

Be it known that I, MONROE FARRAR, a citizen of the United States, and a resident of Chicago, in the county of Cook and State of Illinois, have invented certain new and useful Improvements in Vehicle-Wheels; and I do hereby declare that the following is a full, clear, and exact description thereof, reference being had to the accompanying drawings, and to the letters of reference marked thereon, which form a part of this specification.

This invention relates to improvements in vehicle wheels and more particularly to that class of vehicles known as tractors.

As generally constructed, wheels applied to tractors are not provided with devices to cushion or soften the action of the vehicle in passing over hard or rough roads, with the result that the application of the load under such conditions to the gears and connected motor mechanism, results very frequently in the crystallization and breaking of shafts, gears and other parts. Even when the front of the machine is provided with shock absorbers in the form of springs or other devices, the trouble just mentioned occurs nevertheless because of the rigid connection of the tractor or driving wheels with the gears and motor mechanism.

The jar or shock to the average tractor when passing over hard roads is such that bolts and rivets loosen up and require constant attention in order that the machine may be held together. Again the vibration of tractors even when passing over hard roads creates a plurality of minor aggravating troubles among which may be mentioned the causing of the gasolene tank to leak, the causing of the radiator to leak and the disarrangement of the copper tubing leading from the gas tank to the carbureter, causing said tubing to almost constantly leak and frequently become entirely broken off. It is a common experience of users of tractors now generally on the market, to lay them up for repairs very frequently. In fact, many engineers and tractor users consider such machines are fit only for field work where the yielding ground has a tendency to absorb some of the shock and vibration. The life of the machine is thus materially reduced and the cost of up-keep is considerable, making the machine as a whole an expensive proposition.

The principal object of my invention is to provide a shock absorber in the construction of the tractor wheels which will eliminate or at least reduce to a negligible quantity, the troubles and difficulties above mentioned,—which will increase the life of the tractor and which will reduce the cost of upkeep to a most appreciable extent.

Another object of my invention is to make it possible by reason of the shock absorber construction, to increase the speed of a tractor so that on hard roads it may be run as high as fifteen miles per hour without damage or injury to the working parts.

These and other advantages will be seen as I proceed with my description.

In that embodiment of my invention illustrated in the accompanying drawings,

Figure 1 is a side elevation of a tractor wheel embodying my invention, a small portion thereof being in section to show the construction of how one end of a spring is mounted.

Fig. 2 is a transverse, vertical sectional view of a portion of the wheel, taken upon the line 2—2 of Fig. 1.

Fig. 3 is a similar view taken upon the line 3—3 of Fig. 1.

Fig. 4 is a perspective view showing one of the brackets.

Fig. 5 is a perspective view of a stay-plate of I-beam form.

Referring to said illustrations, the letter A represents the wheel as a whole; the numeral 1, the hub ring, and the numeral 2, the tread ring. Circumferentially arranged about the hub 1 and intermediate said hub and the tread 2 is an intermediate ring 3 suitably secured to the hub 1, as by spokes 4. The numeral 5 indicates an internal gear, located on the inner face of the intermediate ring 3 and is adapted to be engaged with a suitable driving gear, not shown, operated from the motor of the tractor or other vehicle to which this wheel may be applied.

Placed at diametrically opposite positions upon the outer surface of the intermediate ring 3 are four clips or spring-holding members 6, suitably secured to said ring 3 by bolts 7. These clips surround and hold to the intermediate ring 3, the springs 8. These springs consist of a plurality of resilient, relatively thin and flat members superposed upon each other, as indicated very clearly in Fig. 1,—the center member being longest and the flat members on either side being progressively shorter.

Mounted at suitable intervals around the inner surface of the rim 2, are brackets 9 and 9ª, as shown in Fig. 1. Brackets 9 are eight in number, and are illustrated in Fig. 4. There are four brackets 9ª, which are, in effect, two of the brackets 9 integrally connected. The brackets 9, and the ends of the brackets 9ª are L-shaped and suitably secured to the tread ring or rim 2, by bolts 10. The legs of these brackets are bifurcated, as shown at 11, to form a bearing 12 for the end 13 of the roller 14. Retaining pins 15 hold the roller ends 13 in the bearings. A pair of these bearings 12 are used for each spring end, as shown.

Mounted upon the roller 14 is a sliding spool member 16, and also mounted upon the roller 14 are two springs 17, one at each end of the spool 16, and between the spool end and the bifurcated member 11 of the bracket 9. Extending inwardly from the spool 16 are lugs 18, suitably spaced apart the distance of the width of the spring 8. The end 19 of the long leaf member of the spring 8, is suitably secured to and between the lugs 18 by a pin or bolt 20.

It will thus be seen that any unevenness of the ground or any obstruction encountered by the face of the tread ring 2 will be compensated for by the springs 8 suitably yielding as the wheel rotates.

It will also be understood that as the springs 8 yield or bend, the ends 19 will also move longitudinally with respect to the rollers 14 on the tractor wheel. In other words, the springs 8 act as shock absorbers or buffers to vertical or angular relative movement between the tread ring 2 and the intermediate ring 3 and hub ring 1 to which it is rigidly connected; while the sliding connection of the spring ends with the rollers 14 fixed in the bearing brackets 9 will compensate for any relative rotary movement between the tread ring 2 and the intermediate ring 3.

This construction has been found to be most advantageous, therefore, in practically eliminating the vibration and jar and shock due to uneven roads or obstructions in the road, and at the same time affords such a rigid construction as to permit of its use upon vehicles traveling at a relatively high speed so far as tractors are concerned. It is highly durable, efficient, requires little repair and in practice eliminates all the objections hereinabove set forth with respect to tractor wheels heretofore used, while at the same time attaining the various objects specified to be accomplished.

It sometimes occurs that the tractor or other vehicle to which such a wheel as I have described is applied, will be used for a comparatively long period of time on ground more or less even or soft, and where less resiliency is required between the tread ring of the wheel and its hub. In such instances, I provide as an auxiliary device, a spreader or stay-plate preferably of I-beam form, such as shown in Fig. 5, and position the plate between the intermediate ring 3 and the inner face of the tread ring 2. The spreader plate is of the correct height to be readily slipped into the position indicated in dotted lines in Fig. 1. This is accomplished by the use of L-shaped brackets 21, used in pairs and facing each other, suitably secured to the outer face of the intermediate ring 3 by bolts 22. These brackets, eight in number, are positioned so that one pair is intermediate two adjacent spring-holding clips 6. The L-shaped brackets 21 readily retain the stay-plates indicated by the numeral 23, in their proper position when in use.

Of course, when the tractor is to be used over rough ground or on hard roads, these plates 23 may be slipped out from the position indicated by the dotted lines in Fig. 1, so that the full resiliency of the springs 8 and the other yielding and spring end mountings may be realized.

Modifications may be made as to some of the details of the construction illustrated, without departing from the spirit of my invention, as for example, the spring 17 may in some instances be omitted. These and other changes I desire to be comprehended within the scope of my claims.

I claim as my invention:

1. A wheel comprising a hub, a concentric ring carried thereby, a concentric rim surrounding and spaced from the ring, a plurality of rollers extending circumferentially of the rim, spools mounted on said rollers, and resilient members secured to said ring and pivotally connected to said spools, substantially as described.

2. A wheel comprising a hub, a concentric ring carried thereby, a concentric rim surrounding and spaced from the ring, a plurality of rollers extending circumferentially of the rim, spools mounted on said rollers, springs carried by said rollers and engaging either side of said spools, and resilient members secured to said ring and pivotally connected to said spools, substantially as described.

3. In a tractor wheel provided with a ring rigidly secured to the hub and with a concentric tread ring, and resilient means located between said two rings, rigidly secured to one ring and yieldingly secured to the other, a plurality of spreader or stay-bars of I-beam form positioned between said two rings, and means on one of the rings for holding said bars in position whereby the resiliency of said yielding means is lessened.

In testimony that I claim the foregoing as my invention I affix my signature in the presence of two witnesses, this 19th day of October, A. D. 1918.

MONROE FARRAR.

Witnesses:
TAYLOR E. BROWN,
BERTHA L. MACGREGOR.

Copies of this patent may be obtained for five cents each, by addressing the "Commissioner of Patents, Washington, D. C."